Nov. 12, 1968     M. PERLMAN     3,410,297
COLUMN VALVE FOR TOILET TANKS WITH ANTI-SIPHON FEATURE
Filed June 8, 1966
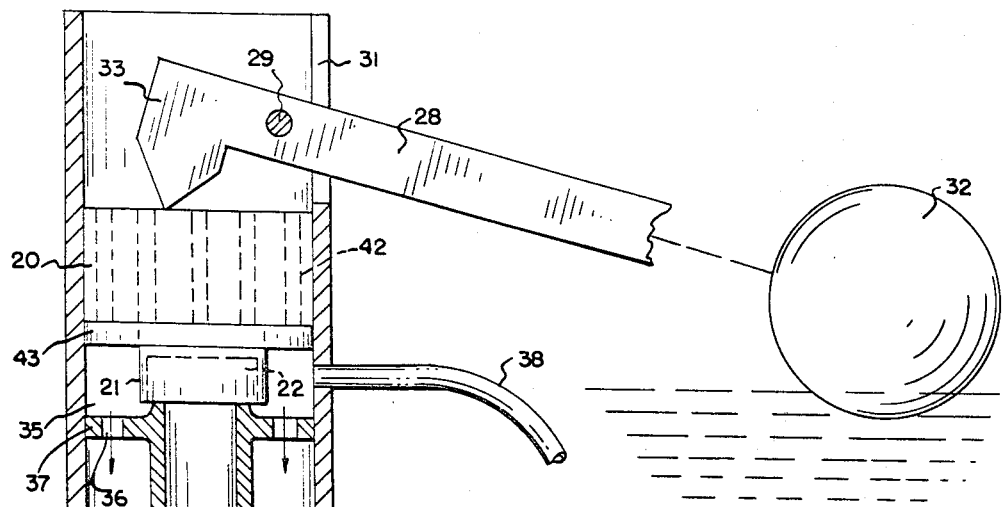
FIG. 1
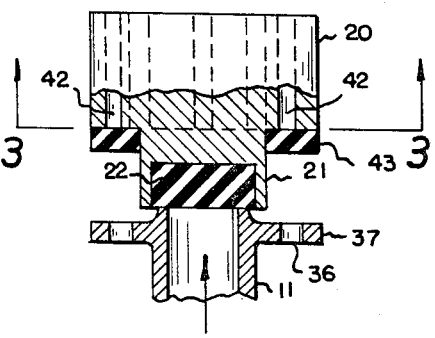
FIG. 2
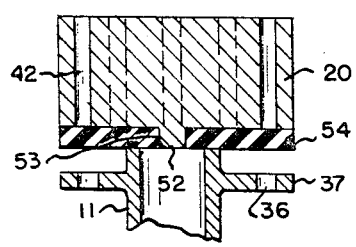
FIG. 4
FIG. 3
INVENTOR
MILTON PERLMAN
BY *Cullen, Sloman, & Cantor*
ATTORNEYS

United States Patent Office 3,410,297
Patented Nov. 12, 1968

3,410,297
COLUMN VALVE FOR TOILET TANKS WITH ANTI-SIPHON FEATURE
Milton Perlman, 12785 Biscayne Bay Drive, North Miami Beach, Fla. 33161
Filed June 8, 1966, Ser. No. 556,104
4 Claims. (Cl. 137—218)

This application relates to column valves as used conventionally in toilet tanks and particularly aims to provide a simplified construction including an anti-siphoning feature, incorporated in a sealing plug of the valve.

An embodiment of the invention is illustrated in the appended drawing. In this drawing:

FIG. 1 shows diagrammatically and in elevation cross-section one form of the valve.

FIG. 2 is a fragmentary vertical section view.

FIG. 3 is a plan section view as if on line 3—3 of FIG. 2.

FIG. 4 shows a modified form of sealing plug.

The drawing shows a column valve for toilet tanks having an outer tube 10 within which is an inner tube 11 whose lower end 12 serves as an inlet and is connected to a water pressure line such as the house waterline. The lower end 14 of the outer tube is open to serve as an outlet for water to flow into the toilet tank. The two tubes are connected by spaced braces 13 which do not obstruct the outlet at 14.

The upper end of the outlet tube 10 extends well above the upper end of the inlet tube 11. Within the outer tube and substantially filling it transversely is a sealing plug 20 (FIG. 2) having a reduced lower stem 21 containing a seal 22 adapted to seal the upper end of the inlet tube 11.

When the sealing plug 20 is in lower position the upper end of the inlet tube 11 is sealed to prevent water flow. When the sealing plug 20 is elevated, as and when permitted, and as caused by water pressure in the inner tube 11, seal 22 is released from the upper end of inner tube 11 and permits water to flow from the inner tube into space 35 between the inner tube and the plug 20 and through outletting holes 36 in a transverse bracing flange 37 of the inner tube.

Connected to space 35 is a filler tube 38 for filling the toilet bowl when water flow is permitted simultaneously with the filling of the toilet tank from outlet 14.

Control of the position of sealing plug 20 is determined by a biasing means which comprises a lever arm 28 fulcrumed at 29 on the outer tube and passing through a slot 31 of such outer tube and having a float 32 on one end and having its other end formed as a crank 33 for engaging the upper face of the sealing plug when the float is elevated to bias the plug down. On the other hand when the water level in the tank is low and demands water, float 32 lowers itself to release the plug 20 to be moved upwardly by water pressure in the inner tube and thus to permit water flow from the outlet tube at 14 and through the filler tube 38.

Now to be described is the anti-siphon feature. The sealing plug 20 is provided with air passages 42 connecting its upper and lower faces. An anti-siphon seal 43 surrounds the stem 21 and normally seals the lower face of the plug and the lower ends of the air passages to provide the anti-siphon feature.

When there is adequate water pressure in the inner tube, seal 43 seals the air passages 42 and this is the normal condition. However, when an abnormal condition develops, such as failure of water pressure at inlet 12 or the development of a suction at inlet 12, and at the same time seal 22 fails properly to seal the inner tube, under such circumstances seal 43 will move downwardly to open the air passages 42 and cause a suction of air rather than a back flow of water. In this way a back flow of water into the house waterline from the lower end of inner tube 12 is prohibited.

FIG. 4 shows a modified form of sealing plug 20 with air passages 42, and having on its lower face a snap bump 52 received in a snap hole 53 of a disc-like seal 54, the latter serving to seal downwardly against and thus to seal the upper end 11 of inner tube 12; and also to seal upwardly against and thus to seal the lower ends of passages 42 for the anti-siphon action.

Whereas FIGS. 1–3 show the two seals 22 and 43 to be separate, FIG. 4 shows them as integral.

Now having described the column valve herein disclosed, reference should now be had to the claims which follow.

I claim:

1. In a valve comprising an outer tube containing an inner tube, with the lower or inlet end of the inner tube being adapted to be connected to a water line, and the lower end of the outer tube being open to serve as a water outlet;

a sealing plug in the outer tube above the upper end of the inner tube;

said plug being of the diameter of the outer tube to fill it transversely and provided with an intake seal for engaging and sealing the upper end of the inner tube;

and means for biasing the plug downwardly into sealing position and for releasing the plug to be moved upwardly out of sealing position by water pressure in the inner tube;

the improvement comprising: air passages in the sealing plug connecting its upper and lower faces;

and an anti-siphon seal normally sealing the lower face of the plug and the lower ends of the air passages, as when there is water pressure in the inner tube;

said anti-siphon seal moving down automatically to unseal the air passages when there is an absence of water pressure in the inner tube and at the same time the intake seal fails to seal the inner tube.

2. A construction according to claim 1 wherein the biasing means comprises a lever arm fulcrumed on the outer tube, having a float on one end, and having its other end engaging the upper face of the sealing plug when the float is elevated to bias the plug down, and, when the float lowers itself to release the plug to be moved upwardly by water pressure in the inner tube.

3. A construction according to claim 1 wherein the two seals are separate.

4. A construction according to claim 1 wherein the two seals are integral.

References Cited

UNITED STATES PATENTS

| | | | |
|---|---|---|---|
| 2,271,419 | 1/1942 | Egan | 137—444 X |
| 2,290,145 | 7/1942 | Owens | 137—217 |
| 2,294,785 | 9/1942 | Langdon | 137—218 |
| 2,431,457 | 11/1947 | Bondurant | 137—493.2 |
| 2,299,706 | 10/1942 | Svirsky | 137—444 X |
| 2,737,198 | 3/1956 | Elliott | 137—217 |
| 2,967,542 | 1/1961 | Einer | 137—437 |
| 3,339,579 | 9/1967 | Lewis et al. | 137—493.2 |

WILLIAM F. O'DEA, Primary Examiner.

D. H. LAMBERT, Assistant Examiner.